(12) United States Patent
Kuriyama et al.

(10) Patent No.: US 12,457,146 B2
(45) Date of Patent: Oct. 28, 2025

(54) WIRELESS COMMUNICATION METHOD, WIRELESS COMMUNICATION SYSTEM, AND WIRELESS TRANSMISSION DEVICE

(71) Applicant: NTT, Inc., Tokyo (JP)

(72) Inventors: Keita Kuriyama, Musashino (JP); Hayato Fukuzono, Musashino (JP); Toshifumi Miyagi, Musashino (JP); Takeshi Onizawa, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/833,070

(22) PCT Filed: Feb. 7, 2022

(86) PCT No.: PCT/JP2022/004605
§ 371 (c)(1),
(2) Date: Jul. 25, 2024

(87) PCT Pub. No.: WO2023/148954
PCT Pub. Date: Aug. 10, 2023

(65) Prior Publication Data
US 2025/0112814 A1    Apr. 3, 2025

(51) Int. Cl.
*H04L 27/34* (2006.01)
*H04L 27/38* (2006.01)
*H04W 52/06* (2009.01)

(52) U.S. Cl.
CPC ...... *H04L 27/3483* (2013.01); *H04L 27/3809* (2013.01); *H04W 52/06* (2013.01)

(58) Field of Classification Search
CPC . H04L 27/3483; H04L 27/3809; H04W 52/06
See application file for complete search history.

(56) References Cited

U.S. PATENT DOCUMENTS 9,553,754 B1 * 1/2017 Dorosenco .......... H04L 27/3863
11,700,081 B1 * 7/2023 Eistein .................. H04L 5/0044
714/726

(Continued)

OTHER PUBLICATIONS

IEEE, "Part 11: Wireless LAN Medium Access Control (MAC) and Physical Layer (PHY) Specifications Amendment 4: Enhancements for Very High Throughput for Operation in Bands below 6 GHz", IEEE Computer Society, IEEE Std 802.11ac™-2013, Dec. 11, 2013, 425 pages.

(Continued)

*Primary Examiner* — Freshteh N Aghdam
(74) *Attorney, Agent, or Firm* — XSENSUS LLP

(57) ABSTRACT

A wireless transmission device and a wireless reception device that support QAM and APSK are used. The wireless transmission device includes a power amplifier that varies transmission power. A constellation calculation unit calculates an estimated constellation {QAM} predicted to occur when a QAM-modulated signal is amplified by the power amplifier at desired transmission power on the basis of input/output characteristics of the power amplifier, and similarly calculates an estimated constellation {APSK} predicted to occur when an APSK-modulated signal is amplified at the desired transmission power. A modulation scheme selection unit compares an estimated minimum Euclidean distance on the estimated constellation {QAM} with an estimated minimum Euclidean distance on the estimated constellation {APSK}, and selects the modulation scheme having the longer distance.

20 Claims, 7 Drawing Sheets

(56) References Cited

U.S. PATENT DOCUMENTS

2016/0127166 A1\* 5/2016 Zhang ................ H04B 10/5161
398/185
2016/0277083 A1\* 9/2016 Koike-Akino ....... H04B 7/0615

OTHER PUBLICATIONS

ETSI, "Digital Video Broadcasting (DVB); Second generation framing structure, channel coding and modulation systems for Broadcasting, Interactive Services, News Gathering and other broadband satellite applications; Part 1: DVB-S2", ETSI EN 302 307-1 V1.4.1, Nov. 2014, pp. 1-80.

Gazda et al., "M-APSK Modulation for SC-FDMA Communication Systems", Proceedings of 21st International Conference Radioelektronika 2011, Apr. 19-20, 2011, 4 pages.

\* cited by examiner

Fig. 3

|  | PAPR CHARACTERISTIC | MINIMUM EUCLIDEAN DISTANCE |
|---|---|---|
| QAM MODULATION | × (LARGE) | ○ (LARGE) |
| APSK MODULATION | ○ (SMALL) | × (SMALL) |

Fig. 5

|  | LINEAR REGION | NONLINEAR REGION |
|---|---|---|
| QAM MODULATION | ◎ (EXCELLENT) | × (BECAUSE OF HIGH PAPR) |
| APSK MODULATION | ○ (GOOD) | △ (BECAUSE OF LOW PAPR) |

WIRELESS COMMUNICATION METHOD, WIRELESS COMMUNICATION SYSTEM, AND WIRELESS TRANSMISSION DEVICE

CROSS-REFERENCE TO RELATED APPLICATION

The present application is based on PCT filing PCT/JP2022/004605, filed Feb. 7, 2022, the entire contents of which is incorporated herein by reference.

TECHNICAL FIELD

The present disclosure relates to a wireless communication method, a wireless communication system, and a wireless transmission device, and more particularly, to a wireless communication method, a wireless communication system, and a wireless transmission device suitable for use in an environment where transmission power changes.

BACKGROUND ART

Non Patent Literature 1 below describes details of quadrature amplitude modulation (QAM), which is one multi-level modulation scheme for wireless communication. In addition, Non Patent Literature 2 below describes details of amplitude phase shift keying (APSK) which is another example of a multi-level modulation scheme. As represented by these schemes, various multi-level modulation schemes are used in the field of wireless communication.

With regard to the influence of different multi-level modulation schemes on the quality of wireless communication, Non Patent Literature 3 below discloses the following matters:
1. Peak to average power ratio (PAPR) is different for each multi-level modulation scheme;
2. When a power amplifier on the transmitting side uses a nonlinear region, a signal is more likely to be erroneously recognized on the receiving side as the PAPR is higher;
3. When APSK and QAM are compared, the APSK having a lower PAPR is more robust when transmitted in the nonlinear region of the power amplifier.

CITATION LIST

Non Patent Literature

Non Patent Literature 1: IEEE Std 802.11ac-2013, IEEE, 2013
Non Patent Literature 2: ETSI EN 302 307-1 V1.4.1, Digital Video Broadcasting, November 2014
Non Patent Literature 3: "M-APSK Modulation for SC-FDMA Communication Systems", Juraj GAZDA, Denis DUPAK, Dusan KOCUR, Department of Electronics and Multimedia Communications, Faculty of Electrical Engineering and Informatics, Technical University of Kosice, Letna 9, 04200 Kosice, Slovakia, 2011

SUMMARY OF INVENTION

Technical Problem

On the other hand, in a constellation of symbols used in QAM, a plurality of symbols are arranged in a lattice. On the other hand, in the constellation of symbols used in APSK, a plurality of symbols are arranged in one or more concentric circles. When comparing the two, if the number of symbols is the same, the minimum Euclidean distance between the symbols arranged on a QAM constellation is longer than the minimum Euclidean distance on an APSK constellation.

In the communication of the multi-level modulation scheme, the receiving side recognizes the received signal as one of the symbols on the constellation stored in advance. Specifically, likelihoods of a received signal and symbols present around the received signal are calculated for the constellation, and a symbol having the highest likelihood is recognized as the received signal. In this case, the identification accuracy of the received signal becomes higher as the Euclidean distance between the symbols arranged on the constellation is longer. Therefore, in an environment where a received signal is transmitted without distortion, QAM having a longer minimum Euclidean distance is more likely to ensure an excellent bit error rate (BER) compared with APSK.

In a situation where the power amplifier on the transmitting side can amplify a transmission signal in a linear region, distortion hardly occurs in the transmission signal. Therefore, in such a situation, it is easier to ensure better communication quality with QAM than with APSK. On the other hand, in a situation where the transmission power is large and the power amplifier amplifies a signal in a nonlinear region, the case of using APSK is more likely to ensure excellent communication quality than the case of using QAM due to the reason described in Non Patent Literature 3.

In this way, when the suitability of each multi-level modulation scheme is compared, the superiority and inferiority may be reversed depending on whether the power amplifier uses the linear region or the nonlinear region. However, conventionally, control for appropriately switching a multi-level modulation scheme used for communication according to transmission power has not been studied. In this regard, the conventional wireless communication technology has room for further improvement by switching and using a plurality of multi-level modulation schemes.

The present disclosure has been made in view of the above problems, and a first object of the present disclosure is to provide a wireless communication method for ensuring excellent communication quality over a wide transmission power range by appropriately switching and using a plurality of multi-level modulation schemes according to transmission power.

In addition, a second object of the present disclosure is to provide a wireless communication system that ensures excellent communication quality over a wide transmission power range by appropriately switching and using a plurality of multi-level modulation schemes according to transmission power.

In addition, a third object of the present disclosure is to provide a wireless transmission device that ensures excellent communication quality over a wide transmission power range by appropriately switching and using a plurality of multi-level modulation schemes according to transmission power.

Solution to Problem

In order to achieve the above objects, a first aspect is desirably a wireless communication method using a wireless transmission device and a wireless reception device that support at least two multi-level modulation schemes, the at least two multi-level modulation schemes including
a first modulation scheme and a second modulation
scheme, and the wireless transmission device including a power amplifier that varies transmission power, the wireless communication method including:

a step of calculating, by the wireless transmission device, a first estimated constellation predicted to occur when a signal modulated using the first modulation scheme is amplified by the power amplifier at desired transmission power, on the basis of input/output characteristics of the power amplifier;

a step of calculating, by the wireless transmission device, a second estimated constellation predicted to occur when a signal modulated using the second modulation scheme is amplified by the power amplifier at the desired transmission power, on the basis of the input/output characteristics;

a step of calculating, by the wireless transmission device, a first estimated Euclidean distance, which is a characteristic value of an inter-symbol distance in the first estimated constellation;

a step of calculating, by the wireless transmission device, a second estimated Euclidean distance, which is a characteristic value of an inter-symbol distance in the second estimated constellation;

a step of selecting, by the wireless transmission device, a modulation scheme that generates the longer one of the first estimated Euclidean distance and the second estimated Euclidean distance as a scheme used for communication;

a step of commanding, by the wireless transmission device, the wireless reception device to perform communication using the selected modulation scheme; and a step of communicating, by the wireless reception device, with the wireless transmission device using the commanded modulation scheme.

A second aspect is desirably a wireless communication system using a wireless transmission device and a wireless reception device that support at least two multi-level modulation schemes, in which the at least two multi-level modulation schemes include a first modulation scheme and a second modulation scheme, the wireless transmission device includes a power amplifier that varies transmission power, and is configured to execute:

a process of calculating a first estimated constellation predicted to occur when a signal modulated using the first modulation scheme is amplified by the power amplifier at desired transmission power, on the basis of input/output characteristics of the power amplifier;

a process of calculating a second estimated constellation predicted to occur when a signal modulated using the second modulation scheme is amplified by the power amplifier at the desired transmission power, on the basis of the input/output characteristics;

a process of calculating a first estimated Euclidean distance, which is a characteristic value of an inter-symbol distance in the first estimated constellation;

a process of calculating a second estimated Euclidean distance, which is a characteristic value of an inter-symbol distance in the second estimated constellation;

a process of selecting a modulation scheme that generates the longer one of the first estimated Euclidean distance and the second estimated Euclidean distance as a scheme used for communication; and a process of commanding the wireless reception device to perform communication using the selected modulation scheme, and the wireless reception device is configured to communicate with the wireless transmission device using the commanded modulation scheme.

A third aspect is desirably a wireless transmission device that supports at least two multi-level modulation schemes and has a function of communicating with a wireless reception device that supports the at least two multi-level modulation schemes, in which the at least two multi-level modulation schemes include a first modulation scheme and a second modulation scheme, the wireless transmission device includes a power amplifier that varies transmission power, and is configured to execute:

a process of calculating a first estimated constellation predicted to occur when a signal modulated using the first modulation scheme is amplified by the power amplifier at desired transmission power, on the basis of input/output characteristics of the power amplifier;

a process of calculating a second estimated constellation predicted to occur when a signal modulated using the second modulation scheme is amplified by the power amplifier at the desired transmission power, on the basis of the input/output characteristics;

a process of calculating a first estimated Euclidean distance, which is a characteristic value of an inter-symbol distance in the first estimated constellation;

a process of calculating a second estimated Euclidean distance, which is a characteristic value of an inter-symbol distance in the second estimated constellation;

a process of selecting a modulation scheme that generates the longer one of the first estimated Euclidean distance and the second estimated Euclidean distance as a scheme used for communication; and a process of commanding the wireless reception device to perform communication using the selected modulation scheme.

Advantageous Effects of Invention

According to the first to third aspects, it is possible to ensure excellent communication quality in a wide transmission power range by appropriately switching a plurality of multi-level modulation schemes according to transmission power in an environment where the plurality of multi-level modulation schemes can be used.

BRIEF DESCRIPTION OF DRAWINGS

FIG. 3 is a diagram illustrating characteristics of QAM and APSK in comparison.

FIG. 5 is a diagram illustrating the suitability of QAM and APSK in comparison between a case where the power amplifier uses a linear region and a case where the power amplifier uses a nonlinear region.

DESCRIPTION OF EMBODIMENTS

First Embodiment

Overall Configuration of First Embodiment

Figure 1:
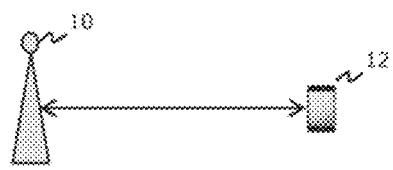
FIG. 1 is a diagram illustrating a configuration example of a wireless communication system according to a first embodiment of the present disclosure.

FIG. 1 is a diagram illustrating a configuration example of a wireless communication system according to a first embodiment of the present disclosure. As illustrated in FIG. 1, the system of the present embodiment includes a wireless transmission device 10 and a wireless reception device 12. The wireless transmission device 10 can be, for example, a wireless communication base station managed by a communication carrier or an access point of a wireless local area network (LAN). On the other hand, the wireless reception device 12 may be a terminal device capable of performing communication in both or one of the licensed band and the unlicensed band.

Features of First Embodiment

In the present embodiment, the wireless transmission device 10 and the wireless reception device 12 each have a function of supporting a plurality of multi-level modulation schemes. Here, specifically, a case where the wireless transmission device 10 and the wireless reception device 12 support quadrature amplitude modulation (QAM) and amplitude phase shift keying (APSK), respectively, will be described.

Figure 2:
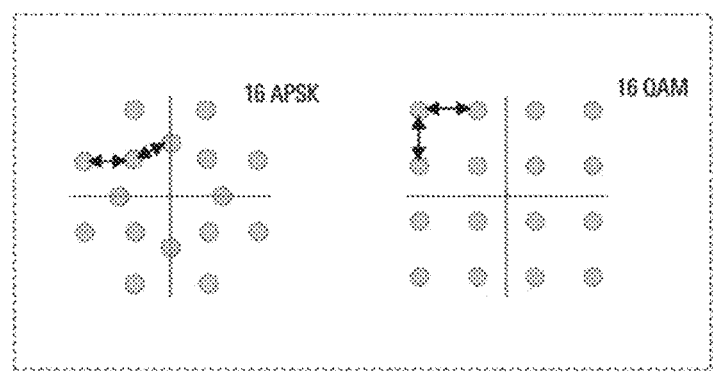
FIG. 2 is a diagram illustrating an APSK constellation and a QAM constellation in comparison.

FIG. 2 is a diagram illustrating an APSK constellation and a QAM constellation in comparison. More specifically, the left side of FIG. 2 illustrates a 16 APSK constellation that handles 16 symbols. In addition, the right side of FIG. 2 illustrates a 16 QAM constellation that handles 16 symbols in the same manner. The position of each symbol represents amplitude and phase.

In the 16 APSK constellation, 16 symbols are arranged at equal intervals by eight symbols on two concentric circles. On the other hand, in the 16 QAM constellation, 16 symbols are arranged at equal intervals in a lattice. In the drawing, the minimum Euclidean distance between symbols in each constellation is represented by a bidirectional arrow. When comparing the two, it can be seen that the minimum Euclidean distance in the case of QAM in which symbols are arranged in a lattice is larger than that in the case of APSK.

Next, a peak to average power ratio (PAPR) will be considered. For transmission of individual symbols on a constellation, a larger amplitude requires a larger power. Therefore, in the APSK, peak power occurs when eight symbols arranged on the outer concentric circle are transmitted. On the other hand, in the case of QAM, peak power occurs when four symbols positioned at four corners are transmitted. Therefore, the ratio of the peak transmission power to the value obtained by averaging the transmission power for all the symbols is lower in the APSK. Therefore, when APSK is used, the PAPR tends to be a lower value than when QAM is used.

FIG. 3 illustrates the characteristics of the minimum Euclidean distance and PAPR described above in comparison between QAM and APSK. ○ and x illustrated in the drawing indicate superiority and inferiority in ensuring a good bit error rate (BER) in wireless communication. The reason why such superiority and inferiority occur will be described below.

The wireless reception device 12 illustrated in FIG. 1 receives a command regarding a modulation scheme to be used for communication from the wireless transmission device 10, and selects a modulation scheme according to the command. In any modulation scheme, the wireless reception device 12 arranges the received signal on a constellation on the basis of the amplitude and the phase, and calculates a likelihood with the received signal for each of the plurality of symbols located around the received signal. Then, the received signal is recognized as a symbol having the highest likelihood.

The longer the minimum Euclidean distance on the constellation is, the large difference is likely to occur in the likelihood calculated for each symbol. Therefore, if the received signal is correctly arranged on the constellation, it is easier to ensure the excellent BER when the QAM having a large minimum Euclidean distance is used than when the APSK having a small minimum Euclidean distance is used. The rightmost column in FIG. 3 represents the relationship as QAM "○ (large)" and APSK "x (small)".

Figure 4:
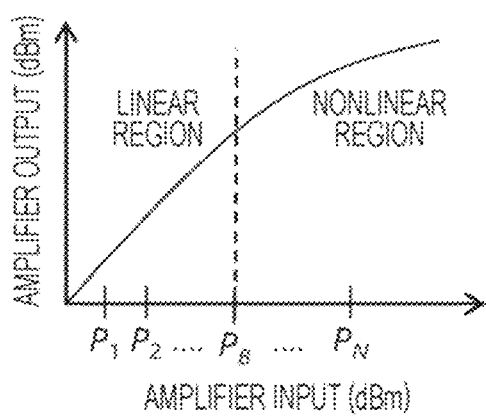
FIG. 4 is a diagram for describing input/output characteristics of a power amplifier included in a wireless transmission device illustrated in FIG. 1.

FIG. 4 illustrates input/output characteristics of the power amplifier included in the wireless transmission device 10 illustrated in FIG. 1. As illustrated in FIG. 4, the power amplifier exhibits a linear input/output characteristic in a region where the input power is PB or less, but the characteristic becomes nonlinear in a region where the input power exceeds PB. Then, distortion is superimposed on the signal amplified by the power amplifier using the nonlinear region. If the distortion occurs in the received signal, in the wireless reception device 12, the received signal is arranged at a position shifted from the original position on the constellation. As a result, the signal amplified in the nonlinear region is likely to be erroneously recognized as an erroneous symbol in the wireless reception device 12.

When the wireless transmission device 10 transmits a radio signal, even if the average power falls within the linear region, a signal with a large amplitude may enter the nonlinear region of the power amplifier. Such a phenomenon is more likely to occur as the PAPR of the multi-level modulation scheme used for communication is larger. Therefore, from the viewpoint of preventing signal misrecognition caused by distortion without distorting the transmission signal, APSK having a low PAPR is superior to QAM having a high PAPR. The center column of FIG. 3 represents the above relationship by the indication of QAM "x (large)" and APSK "○ (small)".

FIG. 5 is a diagram illustrating the suitability of QAM and APSK in comparison between a case where the power amplifier uses a linear region and a case where the power amplifier uses a nonlinear region. When the input power to the power amplifier falls within the linear region, the problem of distortion does not occur even if any modulation scheme is used. In this case, a better BER can be obtained by using QAM rather than APSK in relation to the minimum Euclidean distance. The center column in FIG. 5 represents the above relationship by the indication of QAM "⊙ (excellent)" and APSK "○ (good)".

In the nonlinear region of the power amplifier, the larger the input power, the larger the distortion superimposed on the transmission signal. Therefore, when the input power enters the nonlinear region, a larger distortion is superimposed on the signal corresponding to the peak as the PAPR is higher in the multi-level modulation scheme. Then, as the distortion superimposed on the transmission signal is larger, the signal is more likely to be erroneously recognized in the wireless reception device 12. For this reason, in a situation in which the power transmission device uses the nonlinear region, the communication quality of QAM having a high PAPR is likely to deteriorate more than that of APSK having a low PAPR. The rightmost column in FIG. 5 represents the above relationship by the indication of QAM "x (because of high PAPR)" and APSK "Δ (because of low PAPR)".

As described above, the superiority and inferiority of QAM and APSK are reversed depending on whether the operation region of the power amplifier is a linear region or a nonlinear region. Therefore, in the present embodiment, the multi-level modulation scheme used for communication is appropriately switched between QAM and APSK so that excellent communication quality can be obtained in a real environment in response to this reversal.

[Configuration of Wireless Transmission Device]

Figure 6:
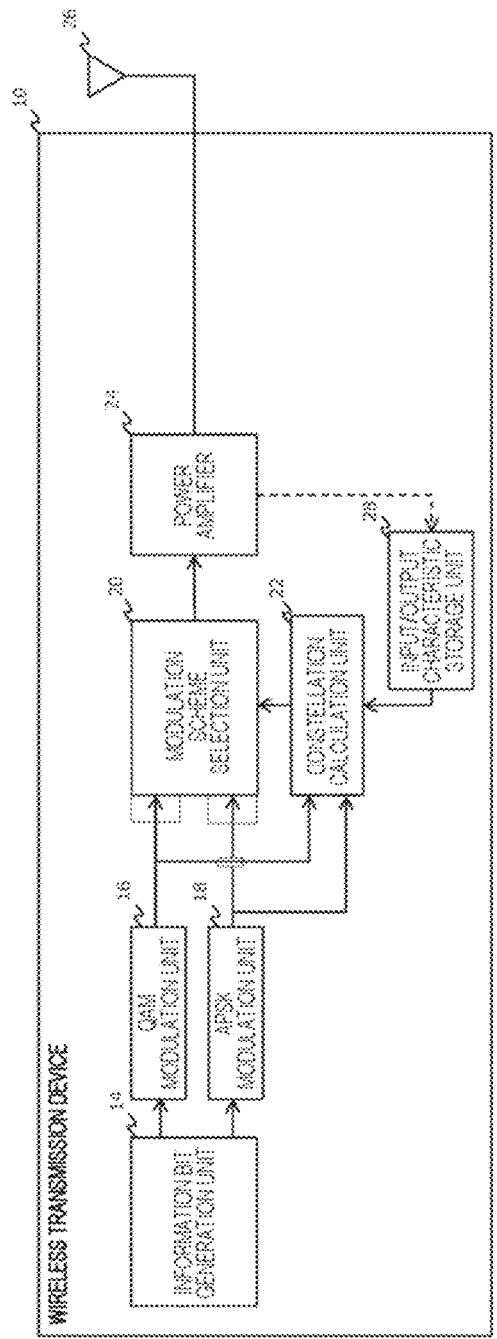
FIG. 6 is a block diagram for describing a configuration of the wireless transmission device according to the first embodiment of the present disclosure.

FIG. 6 is a block diagram for describing a configuration of the wireless transmission device 10 used in the present embodiment to implement the above functions. Each element illustrated in FIG. 6 can be configured by dedicated hardware. Furthermore, these elements can also be configured using an arithmetic processing unit and a program for causing the arithmetic processing unit to execute desired processing, in addition to dedicated hardware.

As illustrated in FIG. 6, the wireless transmission device 10 includes an information bit generation unit 14. The information bit generation unit 14 generates bit data corresponding to information to be transmitted to the wireless reception device 12. The bit data generated by the information bit generation unit 14 is provided to a QAM modulation unit 16 and an APSK modulation unit 18.

The QAM modulation unit 16 modulates the received bit data according to a QAM scheme. On the other hand, the APSK modulation unit 18 modulates the bit data according to an APSK scheme. In either case, the modulated signal is provided to a modulation scheme selection unit 20 and a constellation calculation unit 22.

The modulation scheme selection unit 20 has a function of determining which one of QAM and APSK is appropriate as a modulation scheme used for communication. When it is determined that QAM is appropriate, the modulated signal generated by the QAM modulation unit 16 is provided to a power amplifier 24. On the other hand, when it is determined that APSK is appropriate, the modulated signal generated by the APSK modulation unit 18 is provided to the power amplifier 24. The process of selecting the modulation scheme by the modulation scheme selection unit 20 will be described in detail later.

The power amplifier 24 amplifies the modulated signal generated by the QAM modulation unit 16 or the APSK modulation unit 18 to desired transmission power and supplies the transmission power to an antenna 26. As a result, a signal amplified to desired power by the power amplifier 24 is transmitted from the antenna 26 according to the modulation scheme selected by the modulation scheme selection unit 20.

The wireless transmission device 10 according to the present embodiment includes an input/output characteristic storage unit 28. The input/output characteristic storage unit 28 stores input/output characteristics of the power amplifier 24 in advance. For example, a curve of input/output characteristics as illustrated in FIG. 4 is stored. The input/output characteristic storage unit 28 can provide information on the input/output characteristics to the constellation calculation unit 22.

The constellation calculation unit 22 generates an estimated constellation {QAM} corresponding to a QAM-modulated signal on the basis of the QAM-modulated signal acquired from the QAM modulation unit 16, the input/output characteristics acquired from the input/output characteristic storage unit 28, and the transmission power commanded to the power amplifier 24. That is, what kind of distortion is superimposed on each symbol included in the modulated signal can be estimated on the basis of the input/output characteristics of the power amplifier 24 and the transmission power. Here, assuming that the distortion is superimposed on each symbol, the estimated constellation {QAM} is generated by arranging all the symbols included in the QAM-modulated signal on the constellation coordinates. The constellation calculation unit 22 similarly generates an estimated constellation {APSK} also for an APSK-modulated signal.

The modulation scheme selection unit 20 acquires the estimated constellation {QAM} generated by the constellation calculation unit 22, and calculates an estimated minimum Euclidean distance {QAM} for all the symbols included in the estimated constellation. That is, in the estimated constellation {QAM}, the straight line distance between the closest symbols is estimated. Similarly, the modulation scheme selection unit 20 calculates an estimated minimum Euclidean distance {APSK} on the basis of the estimated constellation {APSK}.

When the power amplifier 24 amplifies the signal in the linear region, since a large distortion is not superimposed on the transmission signal, the estimated minimum Euclidean distance {QAM} tends to be larger than the estimated minimum Euclidean distance {APSK}. On the other hand, in a situation of using the nonlinear region of the power amplifier 24, the relationship is reversed due to the difference in PAPR. In any case, the receiving side can easily recognize the transmission signal correctly as the minimum Euclidean distance is longer.

In the present embodiment, the modulation scheme selection unit 20 compares the estimated minimum Euclidean distance {QAM} with the estimated minimum Euclidean distance {APSK}, and selects the modulation scheme with the longer distance as the scheme to be used for communication. Therefore, according to the wireless transmission device 10 of the present embodiment, it is possible to always employ a modulation scheme advantageous for causing the wireless reception device 12 to correctly recognize a signal regardless of a region in which the power amplifier 24 amplifies the modulated signal.

Flow of Processing in First Embodiment

Figure 7:
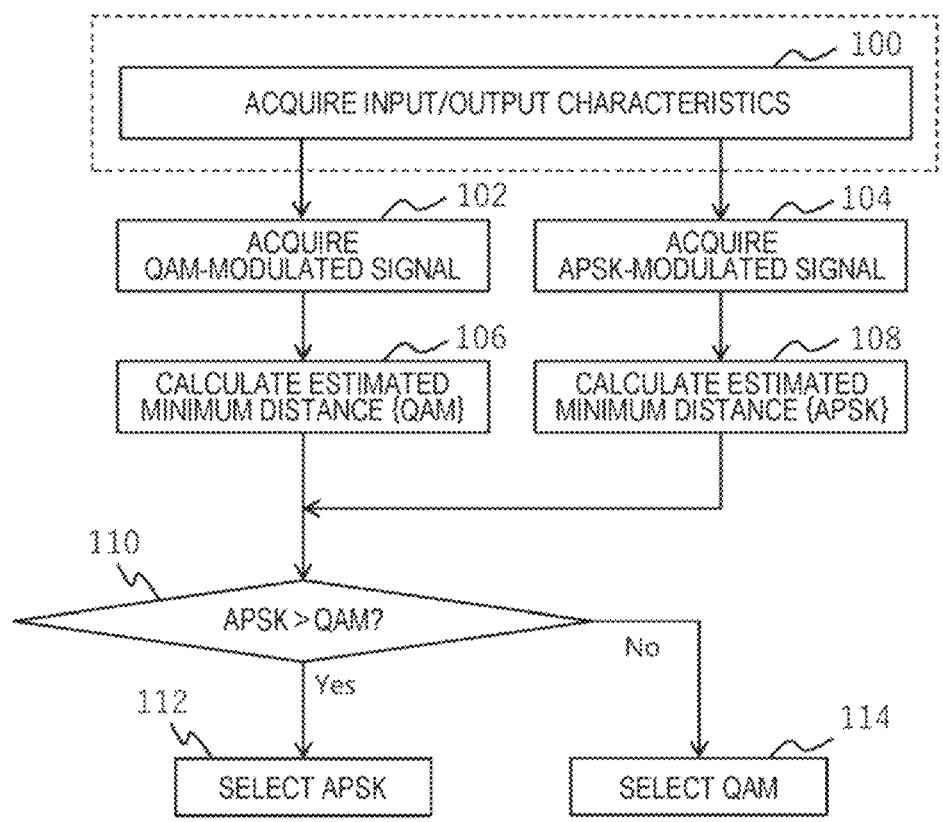
FIG. 7 is a flowchart for describing a flow of main processing performed by the wireless transmission device illustrated in FIG. 6.

FIG. 7 is a flowchart for describing a flow of main processing performed by the wireless transmission device 10 illustrated in FIG. 6. More specifically, it is a flowchart for describing a flow of processing executed in the modulation scheme selection unit 20 and the constellation calculation unit 22.

In FIG. 7, the processes of steps 100 to 108 are executed in the constellation calculation unit 22. Specifically, first, input/output characteristics of the power amplifier 24 are read from the input/output characteristic storage unit 28 (step 100). The process of step 100, that is, the process surrounded by a broken-line frame in FIG. 7 may be performed only once as an initialization process at the start of the operation of the wireless transmission device 10.

Next, the constellation calculation unit 22 acquires a QAM-modulated signal from the QAM modulation unit 16 (step 102), and acquires an APSK-modulated signal from the APSK modulation unit 18 (step 104). Subsequently, the estimated minimum Euclidean distance {QAM} and the estimated minimum Euclidean distance {APSK} are calculated (steps 106 and 108).

In the calculation of the estimated minimum Euclidean distance {QAM}, first, the transmission power used for the current transmission and the QAM-modulated signal acquired in step 102 are applied to the input/output characteristics of the power amplifier 24 to generate an estimated constellation {QAM}. Then, the minimum Euclidean distance in the estimated constellation {QAM} is set as the estimated minimum Euclidean distance {QAM}. The estimated minimum Euclidean distance {APSK} is calculated by a similar procedure on the basis of the APSK-modulated signal acquired in step 104.

The processes of step 110 to 114 are executed in the modulation scheme selection unit 20. That is, when the processes of steps 100 to 108 are completed, the modulation scheme selection unit 20 first determines whether or not the estimated minimum Euclidean distance {APSK} calculated in step 108 is larger than the estimated minimum Euclidean distance {QAM} calculated in step 106 (step 110).

Then, when the estimated minimum Euclidean distance {APSK}> the estimated minimum Euclidean distance {QAM} is recognized, APSK is selected as the modulation scheme used for communication (step 112). On the other hand, when the above relationship is not recognized, QAM is selected as the modulation scheme to be used for communication (step 114). Note that the processes of step 102 to 114 are repeatedly executed for each transmission frame.

As described above, according to the wireless communication system of the present embodiment, the plurality of multi-level modulation schemes can be appropriately switched and used on the basis of the minimum Euclidean distance estimated to be implemented by each transmission signal. As a result, even when the power amplifier 24 uses any transmission power, a modulation scheme advantageous for obtaining high communication quality is always selected. Therefore, according to the wireless communication system of the present embodiment, excellent communication quality can be stably ensured over a wide transmission power range.

Modification Example of First Embodiment

Incidentally, in the first embodiment described above, two of 16 QAM and 16 APSK are used as the multi-level modulation scheme, but the present disclosure is not limited thereto. The number of symbols is not limited to 16, and the number of symbols of the two modulation schemes may be different. In addition, various transmission schemes such as orthogonal frequency division multiplexing (OFDM) transmission, discrete Fourier transform-spread-OFDM (DFT-s-OFDM) transmission, and single carrier (SC) transmission can be applied. Various system configurations such as a single input and single output (SISO) configuration and a multiple input and multiple output (MIMO) configuration can be applied. Further, schemes such as Faster-than-Nyquist (FTN) transmission and Nyquist transmission can also be applied. In addition, three or more modulation schemes may be used to appropriately select an optimum modulation scheme from among these modulation schemes.

In addition, in the first embodiment described above, a scheme used for communication is selected on the basis of comparison between the estimated minimum Euclidean distances calculated for each of QAM and APSK. However, the present disclosure is not limited thereto. The object of comparison may be any object as long as it represents the density of symbols on the estimated constellation. For example, one of QAM and APSK may be selected on the basis of comparison of an estimated average Euclidean distance that is an average of inter-symbol distances on the estimated constellation.

In the first embodiment, the estimated constellation {QAM} corresponding to the QAM-modulated signal and the estimated constellation {APSK} corresponding to the APSK-modulated signal are generated, and the estimated minimum Euclidean distances are calculated on the basis of the generated estimated constellations. However, the present disclosure is not limited thereto. For example, the constellation calculation unit 22 may generate the estimated constellation by reflecting the influence of distortion in the normal constellation for each of QAM and APSK without taking in the QAM and APSK-modulated signals.

Furthermore, in the first embodiment described above, the estimated Euclidean distance {QAM} obtained from the estimated constellation {QAM} and the estimated Euclidean distance {APSK} obtained from the estimated constellation {APSK} are directly compared, but the present disclosure is not limited thereto. For example, a bias value set according to the communication quality may be added to or subtracted from one of the Euclidean distances. In this case, a non-optimum modulation scheme is selected according to the situation, but the frequency of switching the modulation scheme can be reduced.

Furthermore, in the first embodiment described above, the estimated constellation is updated for each frame, and an optimum modulation scheme is selected for each frame. However, the present disclosure is not limited thereto. That is, the frequency of switching the modulation scheme may be set lower than that of each frame by updating the estimated constellation every plurality of frames or every fixed time.

In addition, in the first embodiment described above, the wireless transmission device 10 does not include an adaptive transmission power control unit (ATPC: adaptive transmission power control), but the present disclosure is not limited thereto. That is, ATPC may be incorporated in the wireless transmission device 10, and the transmission power used by the power amplifier 24 may be designated by the ATPC.

REFERENCE SIGNS LIST

10 Wireless transmission device
12 Wireless reception device
16 QAM modulation unit
18 APSK modulation unit
20 Modulation scheme selection unit
22 Constellation calculation unit
24 Power amplifier
28 Input/output characteristic storage unit

The invention claimed is:

1. A wireless communication method using a wireless transmitter and a wireless receiver that support at least two multi-level modulation schemes,
the at least two multi-level modulation schemes including a first modulation scheme and a second modulation scheme, and the wireless transmitter including a power amplifier that varies transmission power, the wireless communication method comprising:

calculating, by the wireless transmitter, a first estimated constellation predicted to occur when a signal modulated using the first modulation scheme is amplified by the power amplifier at desired transmission power, on the basis of input/output characteristics of the power amplifier;

calculating, by the wireless transmitter, a second estimated constellation predicted to occur when a signal modulated using the second modulation scheme is amplified by the power amplifier at the desired transmission power, on the basis of the input/output characteristics;

calculating, by the wireless transmitter, a first estimated Euclidean distance, which is a characteristic value of an inter-symbol distance in the first estimated constellation;

calculating, by the wireless transmitter, a second estimated Euclidean distance, which is a characteristic value of an inter-symbol distance in the second estimated constellation;

selecting, by the wireless transmitter, a modulation scheme that generates a longer one of the first estimated Euclidean distance and the second estimated Euclidean distance as a scheme used for communication;

commanding, by the wireless transmitter, the wireless reception device receiver to perform communication using the selected modulation scheme; and communicating, by the wireless receiver, with the wireless transmitter using the commanded modulation scheme.

2. The wireless communication method according to claim 1, further comprising:

modulating, by the wireless transmitter, information bits to be transmitted to the wireless receiver using the first modulation scheme to generate a first modulated signal; and modulating, by the wireless transmitter, the information bits using the second modulation scheme to generate a second modulated signal, wherein the first estimated constellation is formed by a set of symbols generated when the first modulated signal is amplified by the power amplifier at the desired transmission power, and the second estimated constellation is formed by a set of symbols generated when the second modulated signal is amplified by the power amplifier at the desired transmission power.

3. The wireless communication method according to claim 2, wherein the first estimated Euclidean distance is an estimated minimum Euclidean distance in the first estimated constellation, and the second estimated Euclidean distance is an estimated minimum Euclidean distance in the second estimated constellation.

4. The wireless communication method according to claim 3, further comprising:

a step of setting, by the wireless transmitter, a bias value on the basis of required communication quality; and a step of applying, by the wireless transmitter, addition or subtraction processing of the bias value to the first estimated Euclidean distance or the second estimated Euclidean distance.

5. The wireless communication method according to claim 2, wherein the first estimated Euclidean distance is an estimated average Euclidean distance in the first estimated constellation, and the second estimated Euclidean distance is an estimated average Euclidean distance in the second estimated constellation.

6. The wireless communication method according to claim 5, further comprising:

a step of setting, by the wireless transmitter, a bias value on the basis of required communication quality; and a step of applying, by the wireless transmitter, addition or subtraction processing of the bias value to the first estimated Euclidean distance or the second estimated Euclidean distance.

7. The wireless communication method according to claim 2, further comprising:

a step of setting, by the wireless transmitter, a bias value on the basis of required communication quality; and a step of applying, by the wireless transmitter, addition or subtraction processing of the bias value to the first estimated Euclidean distance or the second estimated Euclidean distance.

8. The wireless communication method according to claim 1, wherein the first estimated constellation is formed by a set of symbols generated when all symbols included in a normal constellation of the first modulation scheme are amplified by the power amplifier at the desired transmission power, and the second estimated constellation is formed by a set of symbols generated when all symbols included in a normal constellation of the second modulation scheme are amplified by the power amplifier at the desired transmission power.

9. The wireless communication method according to claim 8, wherein the first estimated Euclidean distance is an estimated minimum Euclidean distance in the first estimated constellation, and the second estimated Euclidean distance is an estimated minimum Euclidean distance in the second estimated constellation.

10. The wireless communication method according to claim 9, further comprising:

a step of setting, by the wireless transmitter, a bias value on the basis of required communication quality; and a step of applying, by the wireless transmitter, addition or subtraction processing of the bias value to the first estimated Euclidean distance or the second estimated Euclidean distance.

11. The wireless communication method according to claim 8, wherein the first estimated Euclidean distance is an estimated average Euclidean distance in the first estimated constellation, and the second estimated Euclidean distance is an estimated average Euclidean distance in the second estimated constellation.

12. The wireless communication method according to claim 11, further comprising:

a step of setting, by the wireless transmitter, a bias value on the basis of required communication quality; and a step of applying, by the wireless transmitter, addition or subtraction processing of the bias value to the first estimated Euclidean distance or the second estimated Euclidean distance.

13. The wireless communication method according to claim 8, further comprising:
a step of setting, by the wireless transmitter, a bias value on the basis of required communication quality; and
a step of applying, by the wireless transmitter, addition or subtraction processing of the bias value to the first estimated Euclidean distance or the second estimated Euclidean distance.

14. The wireless communication method according to claim 1, wherein
the first estimated Euclidean distance is an estimated minimum Euclidean distance in the first estimated constellation, and
the second estimated Euclidean distance is an estimated minimum Euclidean distance in the second estimated constellation.

15. The wireless communication method according to claim 14, further comprising:
a step of setting, by the wireless transmitter, a bias value on the basis of required communication quality; and
a step of applying, by the wireless transmitter, addition or subtraction processing of the bias value to the first estimated Euclidean distance or the second estimated Euclidean distance.

16. The wireless communication method according to claim 1, wherein
the first estimated Euclidean distance is an estimated average Euclidean distance in the first estimated constellation, and
the second estimated Euclidean distance is an estimated average Euclidean distance in the second estimated constellation.

17. The wireless communication method according to claim 16, further comprising:
a step of setting, by the wireless transmitter, a bias value on the basis of required communication quality; and
a step of applying, by the wireless transmitter, addition or subtraction processing of the bias value to the first estimated Euclidean distance or the second estimated Euclidean distance.

18. The wireless communication method according to claim 1, further comprising:
a step of setting, by the wireless transmitter, a bias value on the basis of required communication quality; and
a step of applying, by the wireless transmitter, addition or subtraction processing of the bias value to the first estimated Euclidean distance or the second estimated Euclidean distance.

19. A wireless communication system using a wireless transmitter and a wireless receiver that support at least two multi-level modulation schemes, wherein
the at least two multi-level modulation schemes include a first modulation scheme and a second modulation scheme,
the wireless transmitter
includes a power amplifier that varies transmission power, and
being configured to execute:
calculating a first estimated constellation predicted to occur when a signal modulated using the first modulation scheme is amplified by the power amplifier at desired transmission power, on the basis of input/output characteristics of the power amplifier;
calculating a second estimated constellation predicted to occur when a signal modulated using the second modulation scheme is amplified by the power amplifier at the desired transmission power, on the basis of the input/output characteristics;
calculating a first estimated Euclidean distance, which is a characteristic value of an inter-symbol distance in the first estimated constellation;
calculating a second estimated Euclidean distance, which is a characteristic value of an inter-symbol distance in the second estimated constellation;
selecting a modulation scheme that generates a longer one of the first estimated Euclidean distance and the second estimated Euclidean distance as a scheme used for communication; and
commanding the wireless receiver to perform communication using the selected modulation scheme, and
the wireless receiver is configured to communicate with the wireless transmitter using the commanded modulation scheme.

20. A wireless transmitter that supports at least two multi-level modulation schemes and has a function of communicating with a wireless receiver that supports the at least two multi-level modulation schemes, wherein
the at least two multi-level modulation schemes include a first modulation scheme and a second modulation scheme,
the wireless transmitter
comprises a power amplifier that varies transmission power, and
being configured to execute:
calculating a first estimated constellation predicted to occur when a signal modulated using the first modulation scheme is amplified by the power amplifier at desired transmission power, on the basis of input/output characteristics of the power amplifier;
calculating a second estimated constellation predicted to occur when a signal modulated using the second modulation scheme is amplified by the power amplifier at the desired transmission power, on the basis of the input/output characteristics;
calculating a first estimated Euclidean distance, which is a characteristic value of an inter-symbol distance in the first estimated constellation;
calculating a second estimated Euclidean distance, which is a characteristic value of an inter-symbol distance in the second estimated constellation;
selecting a modulation scheme that generates a longer one of the first estimated Euclidean distance and the second estimated Euclidean distance as a scheme used for communication; and
commanding the wireless receiver to perform communication using the selected modulation scheme.

* * * * *